(12) United States Patent
Rohlf et al.

(10) Patent No.: US 6,489,040 B1
(45) Date of Patent: Dec. 3, 2002

(54) WALLBOARD WITH IMPROVED ROLL-UP RESISTANCE

(75) Inventors: Evan V. Rohlf, Tower Lakes, IL (US); Charles W. Cochran, Ider, AL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/504,373

(22) Filed: Feb. 15, 2000

(51) Int. Cl.[7] .......................... B32B 24/04; B32B 21/08
(52) U.S. Cl. ...................... 428/532; 428/536; 428/535; 428/537.1; 428/537.5; 428/537.7; 428/703; 428/479.6
(58) Field of Search .............................. 428/537.5, 203, 428/532, 535, 536, 537.1, 537.7, 479.6

(56) References Cited

U.S. PATENT DOCUMENTS

| | | | |
|---|---|---|---|
| 2,346,999 A | 4/1944 | Sandford et al. | |
| 2,352,553 A | 6/1944 | Lefebure | 156/41 |
| 2,560,521 A | 7/1951 | Camp | 156/41 |
| 2,581,076 A | 1/1952 | Camp | 428/478.8 |
| 2,806,811 A | * 9/1957 | Von Hazmburg | 428/530 |
| 2,819,986 A | 1/1958 | Edwards et al. | 428/486 |
| 3,017,305 A | 1/1962 | Dailey | 156/40 |
| 3,141,813 A | 7/1964 | Marek et al. | 162/135 |
| 3,179,529 A | 4/1965 | Hickey et al. | 106/779 |
| 3,300,371 A | * 1/1967 | Hart | 428/414 |
| 3,313,675 A | 4/1967 | Petropoulos et al. | 428/414 |
| 3,389,042 A | 6/1968 | Bieri et al. | 428/447 |
| 3,607,486 A | 9/1971 | Jacks | 156/41 |
| 3,616,144 A | 10/1971 | Kenney | 442/267 |
| 3,692,620 A | 9/1972 | Schmidt et al. | 442/181 |
| 3,694,298 A | 9/1972 | Verschuroff et al. | 428/70 |
| 4,051,291 A | 9/1977 | Long | 428/201 |
| 4,057,662 A | 11/1977 | Johnson et al. | 427/209 |
| 4,195,109 A | 3/1980 | Long | 428/198 |
| 4,204,030 A | 5/1980 | Takamizawa et al. | 428/447 |
| 4,350,736 A | 9/1982 | Reily | 428/341 |
| 4,533,434 A | * 8/1985 | Yoshioka et al. | 162/124 |
| 4,544,424 A | 10/1985 | Take et al. | 156/39 |
| 4,776,970 A | 10/1988 | Hayashi et al. | 508/389 |
| 5,034,501 A | 7/1991 | Ura et al. | 528/263 |
| 5,085,929 A | 2/1992 | Bruce et al. | 428/309.9 |
| 5,198,052 A | 3/1993 | Ali | 156/45 |
| 5,552,187 A | 9/1996 | Green et al. | 427/389.8 |

FOREIGN PATENT DOCUMENTS

| | | |
|---|---|---|
| CA | 569712 | 1/1959 |
| GB | 493078 | 10/1938 |
| GB | 558679 | 1/1944 |
| GB | 695044 | 8/1953 |
| JP | 29300 E/15 | 3/1982 |

OTHER PUBLICATIONS

Wet Strength in Paper and Paperboard—John P. Weidner, editor–"Polyamide–Polyamine–Epichlorohydrin Resins" by W.W. Moyer, jr. and R.A. Stagg;–pp. 33–37.

A Timely Solution—Isovin—New Wet Strenght Additive for Paper Base on Isocyanate Chemistry—Bernd Thiele of Bayer AG, 16 pages.

* cited by examiner

*Primary Examiner*—Leszek Kiliman
(74) *Attorney, Agent, or Firm*—Donald E. Egan; John M. Lorenzen; David F. Janci

(57) ABSTRACT

A gypsum wall board is disclosed in which at least one of the paper cover sheets is made with neutral size and a small amount of a cationic polyamide resin is added to the stock used to make the cover sheet. The paper cover sheets provide improved resistance to post-manufacturing problems that involve delamination, such as "Roll-up".

21 Claims, 1 Drawing Sheet

WALLBOARD WITH IMPROVED ROLL-UP RESISTANCE

The present invention relates to an improved form of gypsum wall board, in which the paper cover sheets have improved resistance to delamination and to longitudinal splitting of the board, particularly, when the board is subjected to handling in post-manufacturing operations, particularly in high humidity environments. The preferred embodiments of the present invention provide a gypsum wall board with improved resistance to "Roll-up" wherein at least one of the paper cover sheets is made with neutral size and a small amount of a cationic polyamide resin is added to the stock used to make the cover sheet.

BACKGROUND

As is well known, paper covered gypsum wall boards are made by enclosing a mass of plastic water-gauged gypsum composition between paper sheets and allowing the resulting product to setup; whereafter it is dried and cut into sheets of the desired size. One of the essential features of such a board is a firm adherence of the central gypsum core to the cover sheets, so that the board will not delaminate at the interface between the core and the cover sheets.

This has been quite satisfactorily accomplished in the past by the addition of farinaceous materials to the core. These farinaceous materials contain a certain percentage of a water-soluble starch which, during the drying of the gypsum board, will migrate to the interface between the core and the cover sheets, and will hence be closely associated with the gypsum crystals which interlock with the fibers of the cover sheets, thereby preventing their release. The presence of the farinaceous material also serves to protect the fine gypsum crystals from becoming calcined during the drying of the board, for if they did so, they would lose their strength, with resulting destruction of the bond between the core and the cover sheets. When such loosening of the bond occurs, the resulting boards are known as "peelers." The gypsum core is thus exposed, and the board, at least to the degree that the peeling extends into the board, is rendered useless, and must be trimmed down to obtain pieces of board of a useful size.

Another type of defect, "rollers", can make its appearance, in the general nature of "peelers", is the result of the delamination of the cover sheets themselves, which split between the plies of paper.

A defect similar to a "roller" and in the general nature of a "peeler" is called a "Roll-Up". A "roll-up" is a post-manufacturing problem, similar to the "peeler" problem, which occurs when paper covered gypsum board is subjected to certain post-manufacture operations. The problem frequently appears in the manufactured housing area, wherein a vinyl layer is adhered to the face side of a gypsum board using a laminating process. Because of the manipulation of the gypsum board in conditions encountered in the lamination process (high humidity and temperature), one or more plies of the 6 or 7 ply paper on the back of the board can become damaged. The "Roll-Up" damage occurs when portions of one or more plies of the backing paper separate from the underlying plies of the backing paper and create various defects including the formation of small, tightly packed rolls, not unlike a cigar, on the back surface of the gypsum board. The cigar-like rolls and other defects on the back of the gypsum board can damage the vinyl surface when the laminated boards are stacked after the laminating operation. The "Roll-Up" problem involves the delamination of paper plies, not the separation of the paper backing from the core of the gypsum board.

The cover sheets usually employed in the production of gypsum core boards consist, in the case of wallboard that is intended to form the internal walls of rooms, of two types. The cover sheet used on the face side of the board is in the form of a paper built up of a plurality of plies, the two outer plies being usually of a somewhat better grade of recycled paper, such as fly-leaf and newsprint paper. The furnish is a mixture of ground wood, thermal mechanical and sulfite pulps for the outer plies. The inner plies, including the one which will be in contact with the gypsum core of the board is usually made of repulped newsprint and pre-consumer corrugated boxes. The paper used to line the backside of the board is usually made of a plurality of plies of repulped newsprint and post-consumer corrugated boxes. In any event, the papers are made on what is known as a cylinder machine, the pulp being picked up on rotating screens, so that a plurality of layers or plies will be obtained, which, by being superimposed upon each other immediately after their formation will bond to each other and produce a substantially uniform piece of paper. Under certain circumstances, such paper is subject to separation of the plies from each other, i. e. it may delaminate.

When gypsum board is covered with multiple ply paper is dried, there appears to be set up in the paper rather severe strains. Water vapor is absorbed and relaxes the severe strain when the gypsum board is shipped into areas of high humidity and temperature. By relaxing the strain, in severe cases, even the longitudinal splitting of the ply which is nearest to the core may occur. This may occur on either the front or the back of the gypsum board, and is probably attributable to the development of undue strain in the plies, of the paper during the drying of the board.

A factor of great importance is the strength of the bond between the gypsum core and the paper cover sheets, so that the paper cover sheets will not "peel" or de-laminate from the gypsum core. A weakness of the interface bond will produce a totally unacceptable wall finish. Additionally, it is necessary that the paper cover sheets, which are conventionally manufactured, do not delaminate between their adjacent plies.

With reference to the paper cover sheets themselves, they must be of uniform strength throughout with strong bonds between the plies. Additional wet strength in the paper cover sheets make it possible ship gypsum board panels into high humidity and temperature regions without post manufacturing "roller" defect problems.

THE PRIOR ART

The prior art describes a wallboard in which at least one ply of the paper cover sheet incorporates a cationic polyamide type resin to supplement the conventional rosin and alum size in order to address the "peeler" problem for "high suction" gypsum board panels. These high suction panels are used as a base for the application of conventional plaster. Gypsum board panels used as the substrate for the application of plaster are required to absorb high amounts of water from the plaster in order to allow the plaster to set.

However, the addition of polyamide type resin, which is compatible with the rosin and alum size, does not change the high suction properties of the gypsum board. The alkaline salt that is added to the paper plies does prevent the migration of the size into the cover sheet to maintain the high suction properties of the paper. At times the presence of the size at the surface of the gypsum board produces a slick bond, which means the crystals of gypsum plaster at the interface do not penetrate the "high suction" paper and the bond between the paper and the plaster is greatly impaired. This problem has been addressed in the prior art by adding an alkaline salt to the central plies of the paper to prevent the alum from acting as a mordant. The rosin size can not properly impart water resistant to the paper so the high suction properties of the paper are maintained.—See U.S. Pat. No. 3,300,371 to Hart.

U.S. Pat. No. 2,806,811 to von Hazmburg describes an improved gypsum-core plasterboard, having paper cover sheet containing a strength-imparting resin, such as a melamine-aldehyde condensation product or a urea-aldehyde resin to impart a greater degree of wet strength to the plies. The resins described by von Hazmburg, such as the melamine-aldehyde condensation products or the urea-aldehyde resins, are compatible with the acid paper sizing systems based on rosin and alum that were used in the 1960s, but that those resins do not work for the present neutral paper sizing systems that have a pH between 6 and 8. Moreover, the melamine-aldehyde condensation products are no longer used because the free formaldehyde inherently in the melamine-aldehyde condensation products is ultimately released from the gypsum board panel as a gas. Formaldehyde is a carcinogen and the use of this chemical is restricted in the air-tight houses manufactured today. The prior art does not suggest, however, the addition of cationic polyamide wet strength resins to the backing paper of a gypsum board in order to address the roll-up problem to which the present invention is addressed.

OBJECTS OF INVENTION

It is, therefore, an object of the present invention to provide a gypsum board which has improved resistance to delamination between the plies of the cover sheets, e.g. improved resistance to "roll up".

It is yet another object of the present invention to provide a novel gypsum board in which the strength of the wet bond between the plies of the paper and the bond between the paper cover sheets and the gypsum core is greatly improved.

It is therefore one of the objects, of the present invention to provide a suitable paper cover sheet for gypsum covered wallboards which is of such a nature that it will resist delamination between the plies and resist splitting off the ply directly adjacent the core.

This object is attained by the incorporation with the furnish from which, at least the cover sheets is made of certain strength-imparting resinous additions, which give the cover sheets a greater degree of wet-strength, so that plies within the cover sheets and the plies adjacent the core will resist delamination and splitting, whereby all difficulties from "roll-up" are minimized or avoided.

SUMMARY OF INVENTION

The present invention provides a paper covered gypsum board in which the cover sheets have improved resistance to delamination problems such as "Roll-up". A gypsum wall board with improved resistance to "Roll-up" is produced by adding a small amount of a cationic wet strength polyamide resin to at least one of the paper cover sheets. In the preferred embodiment, the paper cover sheet includes at least some plies that are made with a neutral size such as alkenyl succinic anhydride (ASA), alkyl ketene dimer (AKD) or neutral rosin and the polyamide resin is added to the paper stock used to produce those plies. Preferably the polyamide resin is added to the paper furnish used to produce all of the plies of the backing paper Preferably the polyamide resin is a polyamide epichlorohydrin resin. The addition of even small quantities (as little as 0.1% by weight) of a polyamide resin prevents the loss of physical properties (strength, tensile) that lead to roll-up problems and other delamination problems. Conventional wet strength resins, such as melamine formaldehydes and urea formaldehydes, are not suitable when the gypsum board paper is sized with either an alkaline size or a neutral size such as alkenyl succinic anhydride (ASA) or alkyl ketene dimer (AKD).

For purposes of the present invention "gypsum wall board" is defined as a gypsum based core encased in a fibrous envelope including a front cover sheet that covers the front of the board and a back cover sheet that covers the back of the board. The cover sheets are multi-ply paper fiber laminates, usually having 6 or 7 plies, wherein the back cover sheet frequently has a different composition than the front cover sheet. For purposes of the present invention "Roll-Up" is defined as a post-manufacturing problem that involves delamination between one or more of the paper plies of the paper cover sheets, and usually the backing paper, but may also be the face paper, especially when the board is handled in high humidity and high temperature environments. For purposes of the present invention, a neutral size is defined as a sizing system that has a pH in the range of about 6.0 to 8.0, as distinguished from conventional rosin/alum sizes that have a pH of about 4.5. In this application, the level of additives used are defined by "pounds per ton" which means the number of pounds of the "active" additive per ton of "dry" paper solids.

THE DRAWINGS

To provide a more clear explanation of the application of these concepts to the preferred embodiment of the present invention, illustrative drawings have been annexed to form a part of this disclosure. In the drawings.

DETAILED DESCRIPTION OF THE PRESENT INVENTION

Figure 1:
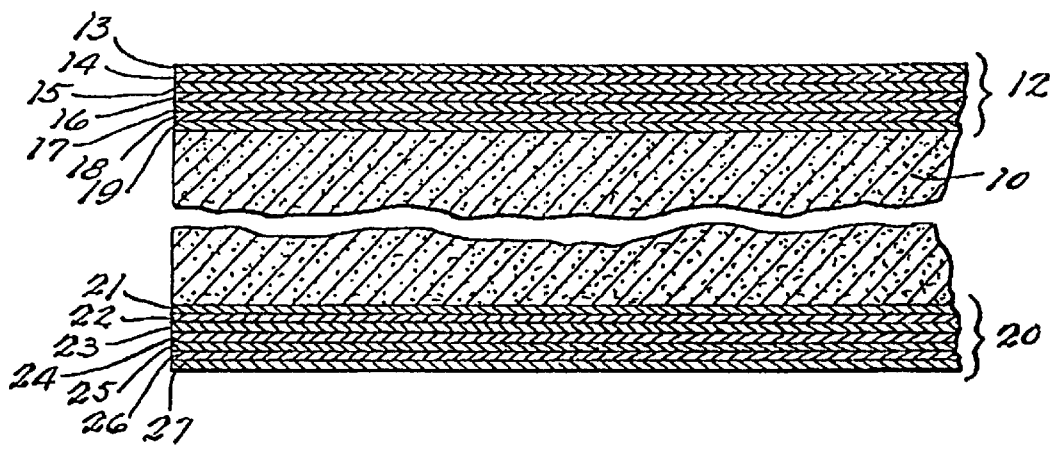
FIG. 1 is a partial expanded view of an end of a gypsum board.

The present invention provides an improved gypsum wallboard having cover sheets that provide improved resistance to "Roll-up" and other similar problems involving the delamination of the plies of the cover sheets. Referring to the drawings, a gypsum wall board comprises a core 10 encased in a fibrous envelope consisting of a Manila sheet 12 that covers the front of the board and a Newslined sheet 20 that covers the back of the board. The core 10 is conventional and comprises the usual ingredients of a set slurry of calcium sulfate hemihydrate, water, starch, foam, etc. The cover sheets 12 and 20 are used to enclose a core 10 containing a cementitious slurry of calcium sulfate hemi-hydrate, water, starch, foam, set-accelerating reagents, fibers, etc. The process of making gypsum wallboard has been the subject matter of many patents and is not claimed herein except as related to the application of the fundamental principles of this invention.

THE BOARD-MAKING PROCESS

The actual manufacture of the gypsum board, as previously indicated, is conventional. A proper gypsum slurry with calcium sulfate hemihydrate, water starch, foam, accelerator, etc., is made and dropped on a paper cover sheet in a conventional gypsum wallboard machine. The paper sheet is folded so that its outer edges are slightly retroverted and are spaced inwardly from the edge of the board. A top cover sheet is applied to the upper exposed surface of the gypsum slurry and glued to the retroverted edges of the bottom sheet. The sandwich of gypsum core with its enclosing paper cover sheets is conveyed on a belt until the gypsum core sets. After this, the sandwich is cut to appropriate length and is conveyed through a drier where the excess water is driven from the gypsum core after final set taken piece.

The formed board is produced in one continuous stream. After the cementitious core reaches a satisfactory degree of hardness, the stream is cut into desired lengths, which are then passed through a drying kiln to remove the excess of water, which was needed to render the mass plastic and flowable before its encasement. The wet board in the course of its drying passes through a high temperature zone of about 500° F., then through an intermediate zone of about 275° F. and finally through a dry end zone of about 150°–200° F. Normally under conditions enumerated above, a gypsum: board ⅜ inch thick will take about forty-five minutes to pass through the drying kiln zones and emerge as a dry sheet ready for packaging and storage.

The paper cover sheets 15 and 16 are bonded to the core 11 by the penetration of gypsum crystals which, when the excess water of the gypsum slurry is driven off by drying, interlock with the paper fibers in the sheet to form a stable and a strong bond.

THE PAPER-MAKING PROCESS

As indicated, the paper cover sheets 12 and 20 are typically made with seven plies. This paper can be made on any conventional cylinder paper-making machine having seven wells or compartments for holding the paper stock individually for each ply. The paper stock is sized with a neutral size such as alkenyl succinic anhydride (ASA) or alkyl ketene dimer (AKD) or neutral rosin. Such neutral sizes and suitable emulsifiers are commercially available from numerous sources. For example, commercially available ASA sizes include Accosize 18 from Cytex, Bersize 6400 from Bercen and Nalco 7540 and Nalco 7542 from Nalco. These are typically used with emulsifiers such as Nalco 7541 from Nalco and Redisize 155 from National Starch.

The cationic wet strength resin may be added to the furnish in the cylinder wells in an amount of between about 0.05 to 1.25% or 1 to 25 pounds per ton. Preferably, the resin is added to the furnish in an amount between about 0.125 to 0.5% or 2.5 to 10 pounds per ton, but experiments indicate that more resin may be added without impairing the desired characteristics of the paper. The wet strength of the paper will vary depending upon the amount of resin added and the amount of resin retained by the fibers. While the specific example has referred to a cylinder machine having seven wells, other paper making machines may be used. Thus, the Fourdrinier or Inverformer type paper machine, which does not use wells, may be used with equal effectiveness. Also, the resin and other ingredients may be added to the furnish at places other than the wells. For example, the ingredients may be added to the paper stock at the head box or before the refiners.

Normally, and depending on the characteristics desired in the finished board, the sheets will consist of a plurality of plies or layers which are formed on a conventional multi cylinder paper-making machine. While a seven ply paper has been found to be practical, the number of plies may be reduced to as low as three.

The front side of the core is covered with a liner sheet that may have, for instance, two plies 13 and 14 made from a furnish containing ground wood, thermal mechanical and sulfite or any other type of suitable pulp, while plies 15, 16, 17, 18 and 19, known also as filler plies, contain a mixture of pre-consumer waste paper pulps. The furnish for each of these plies is sized with a neutral size such as alkenyl succinic anhydride (ASA), alkyl ketene dimer (AKD) or neutral rosin. Typically, about 5 pounds per ton of ASA or AKD would be used. From about 10 to about 20 pounds per ton of neutral rosin would normally be used. Alum may be added from 0 to 30 pounds per ton and preferably at about 5 pounds per ton to improve the water resistance of the paper. The neutral size and alum, placed into the vat, formed into a ply and then assembled into laminated sheet by means of the multi-cylinder paper forming machine. Alum may be added either into the cylinder vat or before the vat such as the machine chest or refiner chest.

The assembled sheet is passed through one or more presses, dried and calendered into the sheet to be used as a component of gypsum wallboard;

The other side of the core 10 is also covered with a fibrous sheet 20, typically having a somewhat different composition of furnish, since it is not necessary that the appearance of the back side of the wallboard needs to as pleasing as the face side thereof. The back sheet 20 is generally known as a Newslined or back liner and it likewise is made of a number of plies. Plies or fillers 21, 22, 23, 24, 25 and 26 generally consist of a furnish containing a mixture of post-consumer waste papers. Ply 27 normally is made from a furnish containing 100 percent over-issue news-print or post-consumer corrugated containers. All furnishes prior to formation in paper are sized with the proper amounts of a neutral size such as ASA, AKD, neutral rosin and alum to attain the desired degree of water resistance in the product.

THE CATIONIC RESIN

In order to provide a paper covered gypsum board with improved resistance to delaminating or splitting within the plies, e.g. "Roll-up", small quantities of a cationic polyamide resins are added to the furnish used to make the cover sheets. It has been found that the addition of relatively small amounts of selected polyamide resins will prevent or minimize the delamination and splitting of the backing paper plies without sacrificing of production efficiency and loss of desirable characteristics, as well as physical properties, of the gypsum board.

Preferably, the specific resin added to the backing paper is an uncured thermosetting cationic water soluble condensates of basic polyamides and epichlorohydrin. These resins are prepared by reacting epichlorohydrin with basic, low molecular weight polyamides derived from aliphatic dicarboxylic acids (such as adipic or succinic) and polyalkylene polyamines (such as diethylene triamine and tetraethylene pentamine). Sufficient epichlorohydrin is used to convert the secondary amines to tertiary and/or quaternary ammonium groups, thus imparting some cationic character to the resins. This leads to some cross-linking, but the extent of the cross-linking must be carefully controlled to maintain the water solubility. The resulting products consist of moderately long-chain polyamide backbones with many reactive side-chains as branches. The exact structures, however, are not known with certainty.

Such resins are commercially available from the Hercules Betz Company of Wilmington, Del. under the trade name of "Kymene 517" and from Callaway Chemical Co. under the trade names Callaway-4062, Callaway-5821 and Callaway-6310. The three resins sold by Callaway are in the 20,000 to 50,000 molecular weight range. The Callaway 4062 is produced by reacting epichlorohydrin with a polyamide formed by reacting adipic acid with diethylene triamine. It has a dry charge of about 3.0 milliequivalents per gram. The Callaway 5821 is also produced by reacting epichlorohydrin with a polyamide formed by reacting adipic acid with diethylene triamine, but it has a dry charge of about 2.5 to 3.0 milliequivalents per gram. It is understood that the Callaway 6310 is produced by reacting epichlorohydrin with a polyamide formed by reacting a dicarboxylic acid with tetraethylene pentamine. It has a dry charge of about 3.5 milliequivalents per gram It has been found that the addition of such resins, in quantities as little as one-tenth percent (2.5 pounds per ton), by weight of the paper involved in the particular ply, is all that is needed to obtain the desired results and that resin can be added to the fiber slurry at any stage prior to ply formation with beneficial results, provided however that there is sufficient time for its substantial and uniform dispersion among the fibers and the resin is retained in the gypsum board paper. The resin is preferably added in an emulsion form, or as a solution, either directly to the headbox supplying the furnish to the individual cylinder vat, or at some place before the refiner as the pulp is processed through the paper making plant. Obviously it can be added at any stage, but in case of certain thermosetting resins which react within certain time limits, it is advisable to have the reaction take place as close as possible to the vat or sheet-forming machine.

THE ANIONIC POLYMER

To improve the retention of the cationic polyamide resin, a low molecular weight anionic polymer may be added to the paper stock prior to the cationic resin. A suitable polymer is carboxy methylcellulose (CMC), but any low molecular weight polymer containing sulfates, phosphates, carboxylates or hydroxyl groups may be suitable. The molecular weight of these polymers is greater than 10,000 but less than 1,000,000. The preferred molecular weight range is between 30,000 and 500,000. The addition of the low molecular weight anionic polymer to the polyamide resin is at a rate between 1:1 and 1:6 ratio. The preferred addition ratio of the low molecular weight anionic polymer is approximately 1:4 to polyamide wet strength resin.

As indicated, the resin is preferably employed throughout all the plies although it may be added to only the plies that are know to separate. The use of a cationic resin obviates "roll-up" condition and a stronger bond between the paper plies will result.

There are cationically active water-soluble or dispersible amino plastic resins which, by being substantive to cellulose, quickly and completely become deposited upon the fibers of a pulp furnish.

Figure 2:
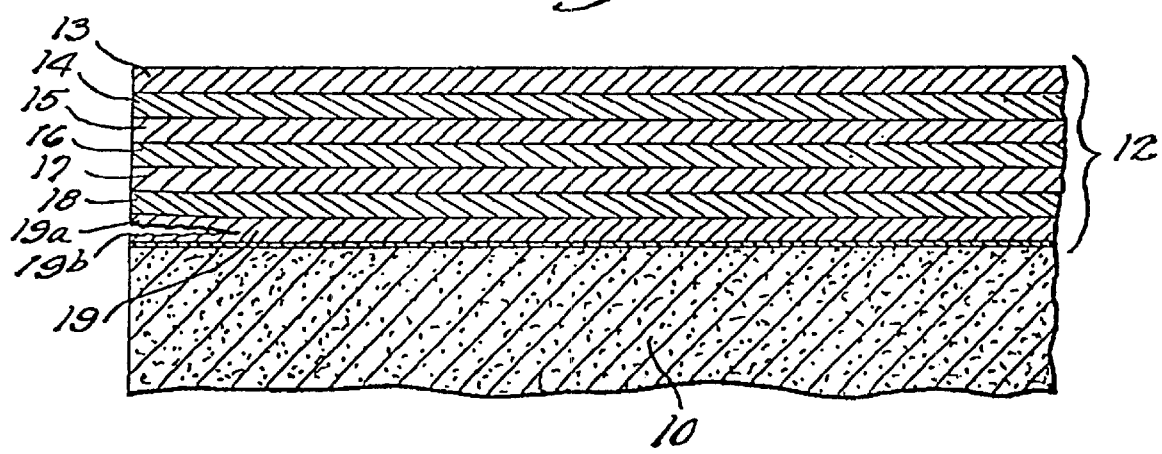
FIG. 2 is an enlarged diagrammatic view on a somewhat larger scale, showing a split ply which will illustrate the type of commonly occurring difficulty in the manufacture of gypsum board and in the post manufacture handling of the gypsum board.

In practice, the delamination-prevention agent is added to the furnish of the ply involved in the splitting. FIG. 2, which is a greatly enlarged fragment of a board core and contacting fibrous cover sheet, shows layers or plies contained in a Manila cover sheet, though any other type of cover sheet will serve for illustrative purposes. In FIG. 2, ply 19 is shown as having split apart or delaminated, as defined hereinabove, into a two section layer 19a and 19b.

By adding the polyamide resin to the furnish entering into the vat forming ply 19 in suitable quantities, this ply 19 does not split or delaminate and thus gypsum wallboard can be produced without any rejects from this cause.

EXAMPLE

A wet strength paper trial was run at a commercial paper mill as part of a study to reduce roll-ups. The paper was made on a cylinder paper machine having seven wells. A stock made up of a mixture of 1600 pounds of post consumer corrugated and 400 pounds of newsprint was used in all 7 wells. The stock for all wells was sized with 5 pounds per ton of ASA size with a neutral pH and 5 pounds per ton of alum. During the test, various amounts of the cationic polyamide epichlorohydrin wet strength resin were added to the paper stock used to make all 7 plies of the paper. The specific resin used was Callaway 5821, manufactured by Callaway Chemical Co. The paper machine operating parameters are shown below in Table 1.

TABLE 1

| Time | 8:00 am | 8:30 | 10:00 | 10:50 | 12:05 pm | 1:05 | 2:00 | 3:00 |
|---|---|---|---|---|---|---|---|---|
| Resin added lb/ton | 0 | 1 | 1.75 | 2.5 | 2.5 | 3.25 | 5.0 | 5.0 |
| Steam Flow #2 | 25.9 | 25.0 | 25.5 | 23.4 | 22.1 | 24.9 | 23.6 | 219 |
| Steam Flow #1 | 28.0 | 26.4 | 25.2 | 22.7 | 24.2 | 22.4 | 23.7 | 20.6 |
| Refiner Amps | 220 | 218 | 218 | 222 | 225 | 222 | 222 | 198 |
| Suction Drum In Hg | −19 | −21 | −21 | −21 | −21 | −21 | −21 | −21 |
| Suction Press In Hg | −20 | −20 | −20 | −20 | −20 | −20 | −20 | −20 |
| 1$^{st}$ Press psi (ft/bk) | 25/25 | 25/25 | 25/25 | 25/25 | 25/25 | 25/25 | 25/25 | 25/25 |
| 2$^{nd}$ Press psi (ft/bk) | 48/48 | 48/48 | 48/48 | 48/48 | 48/48 | 48/48 | 48/48 | 48/48 |
| 3$^{rd}$ Press psi (ft/bk) | 58/58 | 58/58 | 58/58 | 58/58 | 58/58 | 58/58 | 58/58 | 58/58 |
| Main Press Psi (ft/bk) | 60/60 | 60/60 | 60/60 | 60/60 | 60/60 | 60/60 | 60/60 | 60/60 |
| Main Press Uhle Box | −11 | −11 | −11.5 | −11.5 | −12 | −12 | −12 | −11.5 |
| 3$^{rd}$ Press Uhle Box (in Hg) | −15 | −15 | −15 | −15 | −15.5 | −15.5 | −15 | −15 |
| 2$^{nd}$ Top Uhle Box (in Hg) | −4 | −4 | −4 | −4 | −4 | −4 | −4 | −4 |
| Bottom Uhle Box (in Hg) | −15 | −16 | −16 | −16.5 | −17 | −17 | −17 | −17 |
| 1$^{st}$ Top Uhle Box (in Hg) | −10 | −9 | −10 | −10 | −10 | −10 | −10 | −10 |

The amount of the polyamide epichlorohydrin resin added to the paper stock and the amount retained by the paper stock are shown below in Table 2.

TABLE 2

| Time | Resin added (lb/ton) | Resin added (ml/min) | Soluble Charge ($\mu$eq/l) | Fiber Retention First Pass (%) |
|---|---|---|---|---|
| 7:45 am | 0 | 0 | −118 | 60.1 |
| 8:40 am | 0.7 | 200 | — | — |
| 10:00 am | 1.2 | 350 | −149 | 69.6 |
| 12:45 pm | 2.5 | 750 | −34 | 69.9 |
| 2:20 pm | 5.0 | 1500 | −43 | 69.3 |

The physical properties of the paper are shown below in Table 3.

TABLE 3

| Time | Grade | Roll # | Basis Weight | MD Tensile | CD Tensile | Moisture % | Caliper mil | Dryer Pressure | Ply Bond | Porosity sec | Slide Angle |
|---|---|---|---|---|---|---|---|---|---|---|---|
| 7:17 | N/L | 449 | 44.8 | 159.9 | 50.8 | 6.4 | 12.5 | 31 | | 48 | 17.0 |
| 7:54 | N/L | 450 | 45.9 | 177.8 | 51.7 | 6.3 | 12.0 | 39 | 145 | 51 | 18.0 |
| 8:29 | N/L | 451 | 51.8 | 188.2 | 58.2 | 5.5 | 13.0 | 39 | | 60 | 17.0 |
| 8:29 | N/L | 452 | 51.8 | 188.2 | 58.2 | 5.5 | 13.0 | 39 | | 60 | 17.0 |
| 9:17 | N/L | 453 | 53.9 | 191.8 | 58.2 | 5.1 | 14.2 | 38 | 146 | 5I | 17.0 |
| 9:55 | MH | 454 | 51.5 | 193.6 | 55.8 | 5.5 | 14.0 | 39 | 146 | 46 | 13.0 |
| 9:55 | MH | 455 | 51.5 | 193.6 | 55.8 | 5.5 | 14.0 | 39 | 151 | 46 | 13.0 |
| 10:45 | MH | 456 | 52.2 | 189.9 | 55.9 | 6.6 | 14.2 | 34 | 145 | 56 | 13.0 |
| 11:20 | MH | 457 | 51.6 | 189.4 | 59.2 | 6.4 | 14.2 | 29 | 168 | 60 | 13.0 |
| 11:55 | MH | 458 | 50.7 | 187.4 | 58.6 | 7.0 | 13.3 | 27 | 165 | 68 | 13.0 |
| 12:31 | MH | 459 | 51.2 | 190.7 | 58.8 | 6.8 | 13.5 | 27 | 160 | 70 | 13.0 |
| 13:05 | MH | 460 | 52.2 | 191 | 61.0 | 7.0 | 14.3 | 36 | 138 | 64 | 13.0 |
| 13:44 | MH | 461 | 52.2 | 186.5 | 59.9 | 6.7 | 14.0 | 31 | 144 | | 13.5 |
| 14:15 | MH | 462 | 52.1 | 191.7 | 60.2 | 6.1 | 14.2 | 32 | 144 | 74 | 12.0 |

The second column of table 3 gives the paper grade being made at the time indicated in the first column. N/L designates Newslined paper and MH designates for manufactured housing Newslined paper.

The dry strength and the wet strength of the paper was measured and the percent increase in wet strength was computed. The results are shown below in Table 4.

TABLE 4

| Paper Additive | Dry Tensile 15 mm width | Wet Tensile 15 mm width | Percent |
|---|---|---|---|
| 0 lb/ton Roll #447 | 42.44 | 2.89 | 6.8 |
| 2.5 lb/ton Roll #459 | 48.19 | 4.56 | 9.5 |
| 5.0 lb/ton Roll #462 | 45.59 | 5.25 | 11.5 |

In comparing the gypsum board made with the novel paper of the present invention, with gypsum board made with conventional paper, there has been found to be an unusually strong bonding between the plies of the paper and between the gypsum core and the paper. A comparison has been made between conventional gypsum board and the novel gypsum board of the present invention by wetting the paper and then abrading the moisture-laden paper. In the case of regular gypsum board, the paper was found to delaminate in separate plies. In contrast to this, the novel paper of the present invention did not delaminate but the plies were strongly bonded together.

The forms of invention shown and described herein are to be considered only as illustrative. It will be obvious to those skilled in the art that the delamination-prevention materials may be varied somewhat in quantities and in composition. It will be apparent to those skilled in the art that numerous modifications may be made therein without departing from the spirit of the invention and the scope of the appended claims.

We claim:

1. A gypsum wallboard with improved resistance to delamination of the cover sheets, said wall board comprising two paper cover sheets, wherein at least one of said paper cover sheets of said wallboard comprises a plurality of plies, said cover sheet having a plurality of plies that are made with a neutral sizing and from about 1.0 to about 25 pounds per ton of a cationic polyamide resin is added to the stock used to produce said neutrally sized plies.

2. The gypsum wallboard as described in claim 1, wherein all plies of said cover sheet contain a cationic polyamide resin.

3. The gypsum wallboard as described in claim 1, wherein said resin is a polyamide epichlorohydrin resin.

4. The gypsum wall board as described in claim 1, wherein said resin is added to the stock used to produce said plies at a level of from about 1.0 to about 25 pounds per ton.

5. The gypsum wall board as described in claim 1, wherein said resin is added to the stock used to produce said plies at a level of from about 2.5 to about 10 pounds per ton.

6. The gypsum wallboard as described in claim 1, wherein said neutral sizing comprises alkenyl succinic anhydride.

7. The gypsum wallboard as described in claim 6, wherein said alkenyl succinic anhydride is added to the stock used to produce said plies at a rate of about 5 pounds per ton.

8. The gypsum wallboard as described in claim 1, wherein said neutral sizing comprises alkyl ketene dimer.

9. The gypsum wallboard as described in claim 8, wherein said alkyl ketene dimer is added to the stock used to produce said plies at a rate of about 5 pounds per ton.

10. The gypsum wallboard as described in claim 1, wherein said neutral sizing comprises neutral rosin.

11. The gypsum wall board as described in claim 10, wherein said neutral rosin is added to the stock used to produce said plies at a rate of about 10 to 20 pounds per ton.

12. The gypsum wall board as described in claim 1, wherein said neutral sizing comprises alum.

13. The gypsum wall board as described in claim 12, wherein said alum is added to the stock used to produce said plies at a rate of about 5 pounds per ton.

14. The gypsum wall board as described in claim 1, wherein said small amount of a low molecular weight anionic polymer is added to the stock used to produce said plies.

15. The gypsum wallboard as described in claim 14, wherein said anionic polymer has a molecular weight between about 10,000 and 1,000,000.

16. The gypsum wallboard as described in claim 15, wherein said anionic polymer has a molecular weight between about 30,000 and 500,000.

17. The gypsum wallboard as described in claim 14, wherein said a low molecular weight anionic polymer is selected from the group consisting of polymers containing sulfates, phosphates, carboxylates and hydroxyl groups.

18. The gypsum wallboard as described in claim 17, wherein said a low molecular weight anionic polymer is carboxymethyl cellulose.

19. The gypsum wall board as described in claim 14, wherein said low molecular weight anionic polymer is added to the stock used to produce said plies prior to the addition of said cationic polyamide resin.

20. The gypsum wallboard as described in claim 14, wherein the ratio of said low molecular weight anionic polymer to cationic polyamide resin added to the stock used to produce said plies is between 1:1 and 1:6.

21. The gypsum wallboard as described in claim 14, wherein the ratio of said low molecular weight anionic polymer to cationic polyamide resin added to the stock used to produce said plies is about 1:4.

* * * * *